United States Patent [19]

Watanabe et al.

[11] Patent Number: 4,673,541
[45] Date of Patent: Jun. 16, 1987

[54] METHOD AND APPARATUS FOR CONTINUOUS SHAPING OF CARBON-FIBER-REINFORCED PLASTIC TUBES

[75] Inventors: Takahiko Watanabe; Toshiyuki Sugano; Yasushi Yamamoto; Kunihiko Murayama, all of Amagasaki, Japan

[73] Assignee: Agency of Industrial Science and Technology, Tokyo, Japan

[21] Appl. No.: 833,271

[22] Filed: Feb. 27, 1986

[30] Foreign Application Priority Data

Mar. 2, 1985 [JP] Japan .................................. 60-40318

[51] Int. Cl.⁴ ............................................. B29C 35/10
[52] U.S. Cl. ..................................... 264/25; 156/180;
156/273.7; 156/441; 264/26; 264/27; 264/103;
264/134; 264/137; 264/DIG. 65; 425/112;
425/174.6; 425/174.8 R
[58] Field of Search ................... 264/25, 26, 27, 103,
264/134, 137, DIG. 65; 156/180, 273.7, 441;
425/174.8 R, 174.8 E, 174.6, 112

[56] References Cited

U.S. PATENT DOCUMENTS

| | | | |
|---|---|---|---|
| 2,822,575 | 2/1958 | Imbert et al. | 264/26 |
| 2,865,790 | 12/1958 | Baer | 264/26 |
| 3,684,622 | 8/1972 | Goldworthy | 156/180 |
| 3,769,127 | 10/1973 | Goldsworthy et al. | 156/180 |
| 3,960,629 | 6/1976 | Goldsworthy | 156/180 |
| 4,462,946 | 7/1984 | Goldsworthy | 264/149 |

FOREIGN PATENT DOCUMENTS

| | | | |
|---|---|---|---|
| 0099245 | 1/1984 | European Pat. Off. | 264/166 |
| 207081 | 2/1984 | German Democratic Rep. | 264/25 |
| 59-224335 | 12/1984 | Japan | 264/136 |
| 60-220715 | 10/1985 | Japan | 264/136 |

Primary Examiner—Jeffery Thurlow
Attorney, Agent, or Firm—Oblon, Fisher, Spivak, McClelland & Maier

[57] ABSTRACT

A method and an apparatus for continuous shaping of carbon-fiber-reinforced plastic tubes, wherein a carbon fiber prepreg in tape form impregnated with a thermosetting resin is laminated on and around a mandrel, then the laminated carbon fiber prepreg tape on the mandrel is preheated, and the thus preheated laminate is pulled in and through a hot die together with the mandrel so as to subject the carbon fiber prepreg to gelling, curing and shaping into a predetermined carbon-fiber-reinforced plastic tube, the pulling operations being continuously carried out by alternate motion of first and second grasping mechanism in such a manner that the pulling force is generated in the second grasping mechanism, while the first grasping mechanism still retains its pulling force, and finally the gellation of the laminate is completed at the first half part of the hot die.

13 Claims, 8 Drawing Figures

FIGURE 8 *PRIOR ART* ated plastic tubes. More particularly, it is concerned with a method and an apparatus adapted to be used for continuous shaping of carbon-fiber-reinforced plastic tubes having thin wall thickness, light weight, long length and high mechanical strength, such as those used for constructive members of a large-scaled aeronautic and space structure, and others.

As the method for continuous shaping of lengthy shaped products having a definite cross-sectional configuration such as fiber-reinforced plastic (FRP) tubes, in which the reinforcing fibers are impregnated with a thermosetting resin to be made a matrix, there has been well known the pulling method, by which actual production of insulating tubes, anti-corrosive tubes, and so forth of a large wall thickness using glass fibers as the reinforcing material, has been done heretofore.

BACKGROUND OF THE INVENTION

Figure 8:
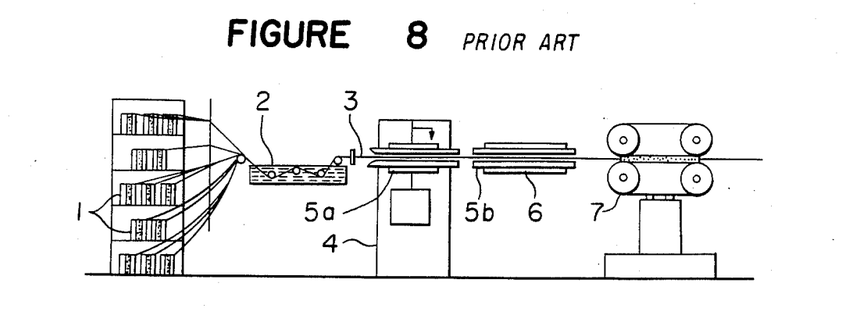
FIG. 8 is a schematic conceptual diagram of a conventional pull-out shaping method and an apparatus for practice of such method.

FIG. 8 of the accompanying drawing shows the basic concept of the conventional pulling method and apparatus, which has been quoted from an unexamined Japanese Patent Publication No. 75263/1975 concerning a shaped product of a solid rod.

In the drawing, a reference numeral 1 designates reinforcing fibers which are delivered out of a plurality of bobbins; a numeral 2 refers to a vessel for impregnating the reinforcing fibers with a thermosetting resin; a numeral 3 refers to a fiber strand impregnated with the resin; a reference numeral 4 denotes a preheater for heating the fiber strand 3 (for the heating means, radio-frequency wave is used in this embodiment); reference numerals 5A and 5B represent squeezing jigs for removing surplus amount of the resin from the fiber strand 3 as well as for regularizing the whole external shape thereof; a numeral 6 refers to a hot die for curing and shaping the impregnated resin; and a numeral 7 refers to a belt-type, continuous pull-out drive mechanism for grasping the shaped product and moving the same to the rightward direction.

Explaining the method of shaping the solid rod in this embodiment, the reinforcing fibers 1 to be delivered out of the bobbins are put together and then the fiber strand is caused to pass through the resin impregnating vessel 2, thereby obtaining the fiber strand 3 impregnated with the thermosetting resin. Thereafter, this fiber-strand 3 is caused to pass through the preheater 4 to heat the same, then the surplus amount of the impregnating resin is removed by the squeezing jigs 5A and 5B during or after passage of the fiber strand through the preheater, and, at the same time, external configuration of the entire fiber strand is regularized. Following this, the resin is cured in the hot die 6 to thereby obtain a predetermined shaped product. In this case, the shaped product is grasped by the pulling mechanism 7 to obtain a pulling force in the right direction. This pulling mechanism is capable of exerting continuous pulling force by a belt-type device.

While the above-described embodiment is for obtaining the solid rod, an Unexamined Japanese Patent Publications No. 96067/1978 and No. 124/1981 disclose methods for pull-out shaping of hollow tubes, which comprises winding on and around a mandrel a fiber strand impregnated with a thermosetting resin, and thereafter subjecting the resin-impregnated fiber strand to the pull-out shaping by the mandrel. Also, an Unexamined Japanese Patent Publication No. 58467/1976 discloses a shaping method of a type, in which two units of the grasping device are alternately operated as the pulling mechanism so as to enable the shaped product to be continuously pulled out.

In addition, there has been a report made by W. B. Goldworthy et al. in "The 36th (1981) Annual Society of Plastics, Session 15-F, pages 1 to 6" concerning a shaping method which is characterized in that the shaped product and the mandrel are moved together by the pulling mechanism having two units of the grasping device, although this method uses an oven type curing means.

These conventional shaping methods as described in the preceding, however, are not able to sufficiently cope with shaping of the carbon-fiber-reinforced plastic tubes of light weight, thin thickness and long length, to be used for the constructive members of, for example, a large-scaled space structure, taking advantage of the superiority in relative strength and relative modulus of elasticity of carbon fibers as the reinforcing material. In more detail, the shaped products for such purpose are required to have their ultimate weight reduction in relation to their requisite mechanical strength, for which a strength sustaining factor, for example, of the shaped product with respect to the theoretical value by the composite material (to be represented by "ROM %" in terms of reduction in thickness to 1 mm or less and precision in shaping) has to be improved. However, these conventional shaping methods did not take this ROM % into account.

Such conventional pull-out shaping method is primarily to obtain with high efficiency a thick shaped product, in which glass fibers are used as the reinforcing material. Therefore, if and when such conventional technique is to be directly applied in the practice of the precision-shaping of a product having thin thickness of 1 mm or less, using the reinforcing fibers of high modulus of elasticity (i.e. the fibers which are brittle and easily breakable) such as carbon fibers, there would inevitably take place considerable decrease in the strength sustaining factor (ROM %) which is dependent on the state of the reinforcing fibers such as breakage and disturbance in orientation of the reinforcing fibers, uneven distribution of the fibers, etc.; a mixing ratio between the fibers and the resin; and further the uniform curing property of the resin, and so forth. As the consequence of this, the value of the strength sustaining factor, in the case of the high precision and high performance products for use in the space structure, becomes not only innegligible, but also totally inadequate for shaping the carbon-fiber-reinforced plastic tubes having a wall thickness of 0.5 mm or less.

Describing this conventional shaping method for each and every process mechanism, there is, at first, a process step, in which the reinforcing fibers are delivered out of a bobbin stock in the form of fiber strand (hereinafter simply called "roving") and then the roving is wound on and around the mandrel after its being impregnated with a thermosetting resin, or the roving is impregnated with the resin after its being wound on and around the mandrel, following which they are forwarded to the subsequent preheating step. At any rate, the reinforcing fibers, in this case, come into direct contact with each of the process mechanism or are subjected to a forced bending. On account of this, when the carbon fiber is used as the reinforcing fibers, there tend to readily occur fuzzing (cracks in the fibers) and breakage of the fibers. Moreover, such resin impregnating means is difficult to control the fiber content $V_f$ (a volume fraction between the fibers and the resin), hence it is difficult to achieve the ultimate reduction in weight of the shaped product with respect to its required mechanical strength.

In addition, since a large number of bobbins are needed at the same time for supply of the reinforcing fibers in the form of roving, it is inevitable that a material feeding section of the process mechanism becomes large in its dimension and occupying area (space). Therefore, when such material feeding section is incorporated in the production line, there take place unavoidably various problems concerning the factory control, material control, and other managerial matters.

In the subsequent preheating step, there has so far been adopted a method of subjecting the only portion of the carbon-fiber-reinforced plastic (in which the carbon fibers are impregnated with the thermosetting resin) to direct induction heating by means of a micro-wave heater using a micro-wave frequency of 2 GHz and higher, in utilization of the dielectric property of the resin. This method is, however, difficult to realize the heat control at the portion of the carbon-fiber-reinforced plastic on account of the heat discharging phenomenon toward the mandrel having a large heat capacity, which not only invites disturbances in the orientation of the fibers and their maldistribution during the subsequent curing and shaping step, owing to non-uniformity in the viscosity of the molten resin prior to the curing, but also is associated with non-uniformity in the curing speed of the resin, all these phenomena constituting the factors to hinder shaping of the high performance carbon-fiber-reinforced plastic.

In the conventional curing and shaping step, a large amount of surplus thermosetting resin has to be removed, since this conventional method is primarily directed to obtain thick shaped product in the main. For removal of such excess amount of resin, various measures were taken such that the squeezing angle in the squeezing section of the hot die for the curing and shaping process is made large, or multi-stage squeezing is carried out, which tends to cause the carbon fibers to be readily broken. Also, in order to restrain back tension at the squeezing section, the speed and the temperature at the pulling operation are so established that the thermosetting resin may be gelled at the latter half part of the hot die. This tends to readily cause disturbance in the orientation of the fibers due to the moving distance of the resin in its molten and flowing state being elongated, thus causing decrease in the strength sustaining ratio (ROM %).

Mentioning about the pull-out drive system, as a recent practical construction, there is a system of moving the shaped product together with the mandrel by use of the two units of grasping mechanism. In this case, however, no sufficient consideration is given to the material for the grasping surface of the mechanism, on account of which the shaped product at its high temperature condition immediately after its passage through the hot die is gripped by a low temperature grasping surface having a large heat capacity with the consequence that the shaped product tends to be readily broken by heat shock due to quenching and be deformed by heat distortion. Further, since the alternate grasping of the shaped product by the two units of the grasping mechanism is effected by the position detection system of the grasping section, there would inevitably exist a state of instantaneous stoppage of the grasping mechanism at the time of changing the grasping operation from one mechanism to the other, on account of which the carbon fibers are subjected to buckling and disturbance in the orientation due to pulsing motion of the grasping mechanism, the both constituting the cause for hindrance in shaping the high performance carbon-fiber-reinforced plastic.

Incidentally, as the method for shaping such high performance carbon-fiber-reinforced plastic, in which more attention is paid to the strength sustaining factor (ROM %), there is a batch shaping method which combines the filament winding and the autoclave curing. This method, however, is considerably inferior in its productivity for the large-scaled space structure, hence it cannot be adopted for the purpose of the present invention.

THE INVENTION

The present invention has been made with a view to solving the points of problem as described in the foregoing, and aims at providing a method and an apparatus for continuous shaping of carbon-fiber-reinforced plastic tubes of a thin wall thickness, according to which, by use of carbon fiber prepreg in tape form impregnated with a thermosetting resin, breakage of the carbon fibers in the step of supplying the material and of laminating the resin on and around the mandrel can be prevented, and the fiber content $V_f$ and the resin property can be made readily controllable; and further, by use of two units of the grasping mechanism in a manner to generate the pulling force of one of the grasping mechanisms, while the pulling force of the other grasping mechanism still remains, the fibers are prevented from buckling.

According to the present invention, in one aspect of it, there is provided a method for continuous shaping of carbon-fiber-reinforced plastic tubes, which comprises steps of: laminating carbon fiber prepreg in tape form impregnated with a thermosetting resin on and around a mandrel; preheating said laminate provided on said mandrel; pulling said preheated laminate in and through a hot die together with said mandrel, during which it is gelled, cured, and shaped into the carbon-fiber-reinforced plastic tubes, said pulling operation being done continuously by alternate operations of a first grasping means, wherein the pulling force of the second grasping means is generated, while the pulling force of the first grasping means still remains, and completing gellation of said laminate at the former half part of said hot die.

According to the present invention, in another aspect of it, there is provided a method for continuous shaping of carbon-fiber-reinforced plastic tubes, wherein the mandrel is subjected to induction heating to indirectly preheat the laminate through the steps of laminating said carbon fiber prepreg in tape form impregnated with the thermosetting resin on and around said mandrel formed of a magnetic material, and causing said laminate provided on said mandrel to pass through a high frequency preheater.

According to the present invention, in other aspect of it, there is provided an apparatus for continuous shaping of carbon-fiber-reinforced plastic tubes, which comprises in combination:

(a) means for laminating carbon fiber prepreg in tape form impregnated with a thermosetting resin on and around a mandrel in synchronism with a moving speed of said mandrel; (b) means for preheating said prepreg laminated on and around said mandrel; (c) a hot die for gelling and curing said preheated prepreg forwarded thereinto together with said mandrel, and for shaping the same into the carbon-fiber-reinforced plastic tubes, said hot die being constructed with a resin squeezing zone, a resin gelling zone, and a resin curing zone, each of said zone being temperature-controlling individually and separately; (d) first and second grasping means for gripping and pulling said shaped product from said hot die together with said mandrel; (e) first and second detectors for detecting the pulling force of each of said grasping means; and (f) pull-out drive means having a controller for generating the pulling force of said second grasping means, while said first grasping means still retains its pulling force, on the basis of the pulling force as detected by said first and second detectors.

According to the present invention, in still other aspect of it, there is provided an apparatus for continuous shaping of carbon-fiber-reinforced plastic tubes, wherein said carbon fiber prepreg in tape form impregnated with a thermosetting resin is laminated on and around the mandrel formed of a magnetic material, then said mandrel is subjected to induction heating with a high frequency in a frequency band of from 10 to 50 KHz, and said carbon fiber prepreg in indirectly heated by said mandrel.

The foregoing objects, other objects, advantages, and features of the present invention will become more readily apparent and understandable from consideration of the following detailed description thereof, especially when taken in conjunction with the accompanying drawings.

The present invention is capable, by use of the carbon fiber prepreg in tape form impregnated with a thermosetting resin, of preventing the fibers from breakage in the course of the material supply and lamination of the tape material onto the mandrel; of facilitating control of the fiber content $V_f$ and the resin property; and, further, of preventing the fibers from buckling by alternate operations of two units of the grasping mechanism in such a manner that one of the grasping mechanism is caused to generate its pulling force, while the other is still maintaining its pulling force.

Also, by indirect preheating of the carbon fiber prepreg through induction heating of the mandrel made of a magnetic material, the temperature control for curing and shaping can be done with high precision.

In the following, the present invention will be described in detail with reference to a preferred embodiment thereof as shown in the accompanying drawing.

Figure 1:
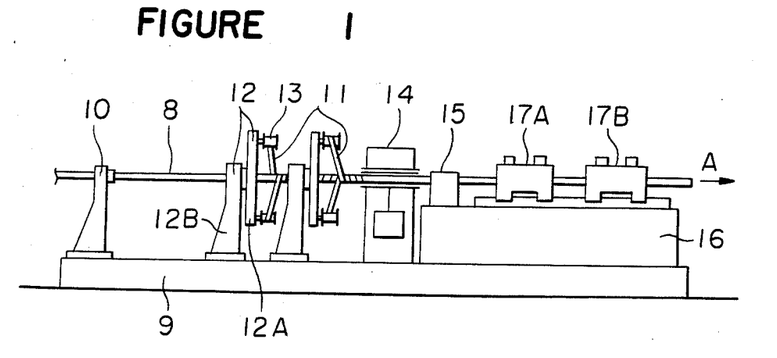
FIG. 1 is a side elevational view showing a general construction of an apparatus, which is for explaining the method for continuous shaping of carbon-fiber-reinforced plastic tube according to the embodiment of this invention.

Referring to FIG. 1, a reference numeral 8 designates a mandrel formed of a magnetic material, which is held on a mandrel support 10 fixed on the base 9 in a manner freely movable in the longitudinal direction. A numeral 11 refers to a carbon fiber prepreg tape which is delivered from bobbins 13, 13 fitted onto shafts fixed on a ring winder 12 and held thereon in a rotatable manner, and is wound on and around the mandrel 8. The boss part of a rotational ring 12A of the ring winder 12 is rotatably supported by the bearing housed in a rotating ring support 12B. The rotational ring 12A itself is rotated by an ordinary drive means such as an electric motor, speed reduction gears, and so forth (not shown in the drawing). At the center of the boss part of the rotational ring 12A, there is formed a hole having a diameter sufficiently larger than that of the mandrel 8, into and through which the mandrel passes. A reference numeral 14 denotes a high frequency preheater, and a numeral 15 refers to a hot die fixed on a stand 16 which, in turn, is fixed on the base 9. Reference numerals 17A and 17B designate respectively the first and the second grasping mechanisms to grip a shaped product and pull the same in the direction of an arrow mark A. The carbon fiber prepreg tape wound on and around the mandrel 8 is gelled and cured, while it is passing through the hot die 15, and is finally shaped into the carbon-fiber-reinforced plastic shaped product.

Figure 2:
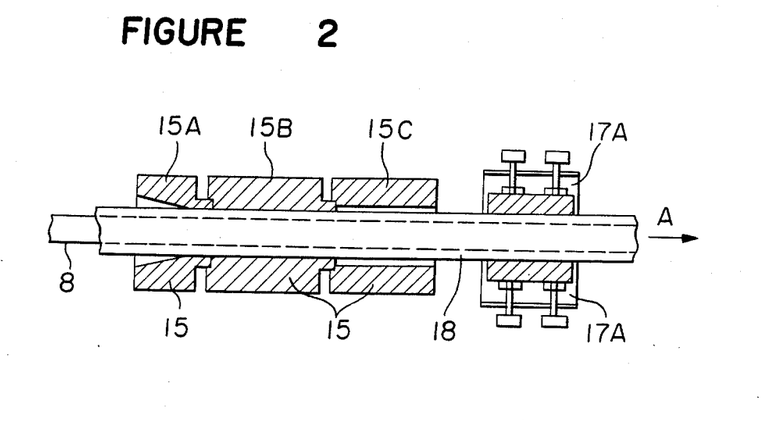
FIG. 2 is an enlarged, longitudinal cross-sectional view showing a structure of the hot die and the grasping mechanism.
Figure 3:
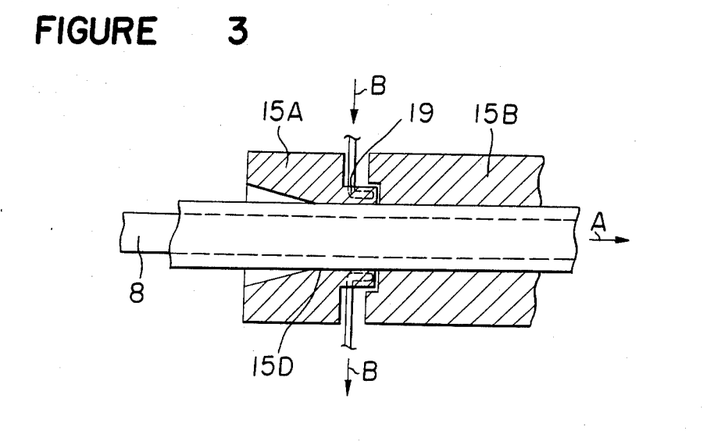
FIG. 3 is an enlarged, longitudinal cross-sectional view showing in more detail a part of the hot die shown in FIG. 2.

Referring now to FIGS. 2 and 3, a reference numeral 18 designates a shaped product, a numeral 15A refers to a resin squeezing zone, 15B a resin gelling zone, 15C a resin curing zone, and 19 an adiabatic temperature control mechanism. An arrow mark B indicates the flowing direction of heating and cooling media.

In the following, explanations will be given as to the shaping method and the apparatus to be used for the practice of such shaping method, according to the present invention. In this practical embodiment, the carbon fiber prepreg tape 11 is used as the constitutent material for the carbon-fiber-reinforced plastic. Each of the bobbins 13 loaded with the carbon fiber prepreg tape 11 (for example, "TORAYCA P405"—a tradename for a product of Toray Kabushiki Kaisha, Japan) is mounted on the ring winder 12. The carbon fiber prepreg tape 11 delivered from the bobbin 13 by rotation of this ring winder 12, i.e., the rotational ring 12A around the mandrel 8 passing through the center, while applying a predetermined back tension to the bobbin 13, is wound on and around the mandrel 8. In this case, the rotational speed of the ring winder 12 is made synchronous with the moving speed of the two grasping mechanisms 17A and 17B so as to control the tape winding speed. Also, an angle for winding the tape 11 may be arbitrarily selected in accordance with a width of the prepreg tape to be used and a fitting angle of the bobbins 13.

In this way, use of the carbon fiber prepreg tape minimizes fuzzing and breakage of the brittle carbon fibers owing to the resin layer, through which the fibers are subjected to bending action or brought into contact with each and every constituent mechanism. Further, since the carbon fiber prepreg is primarily at a predetermined level of the carbon fiber content $V_f$ and the curing, and also, since the fibers are in the uniformly orientated arrangement, the squeezing condition and the curing condition of the resin can be easily controlled and the fiber content $V_f$ can be easily adjusted at the time of its curing and shaping, which makes it possible to suppress the uneven distribution and disturbance in the orientation of the carbon fibers to the minimum possible degree.

The carbon fiber prepreg tape 11 as wound on and around the mandrel 8 moves rightward in FIG. 1 by the pulling force from the two grasping mechanisms 17A and 17B, in the course of which it passes through the high frequency preheater 14. The high frequency preheater 14 is to supply a high frequency field in the frequency band of from 10 to 50 KHz, with which the mandrel 8 alone made of the magnetic material generates heat by the principle of the induction heat, whereby the carbon fiber prepreg tape 11 becomes indirectly preheated. Incidentally, this high frequency preheater 14 should preferably have its capability for readily and arbitrarily adjusting its output in order to cope with varying factors such as quality of the material constituting the mandrel, heat discharge, and others.

In the case of the temperature control for such mandrel having a large heat capacity, as it is least affected by the environmental changes, this indirect preheating system for the carbon fiber prepreg tape provides easy control of every control condition at the time of curing and shaping, i.e., the viscosity adjusting condition of the resin at the time of the squeezing which depends on temperature, the curing condition, and so forth, hence a stable shaping condition becomes readily obtainable.

The carbon fiber prepreg tape 11 which has been preheated by the high frequency preheater 14 then passes through the subsequent hot die 15 together with the mandrel 8 and shaped under the pulling force. The hot die 15 comprises three different zones, i.e., the resin squeezing zone 15A, the resin gelling zone 15B and the resin curing zone 15C, each of the zones 15A, 15B and 15C being separately and independently regulated its temperature. And yet, each of these zones 15A, 15B and 15C is of a setting structure which, for example, can be split into two halves along the sectioned plane parallel to the axis so as to facilitate dismantling for overhaul and cleaning after the shaping operations. The carbon fiber prepreg 11 is once returned to its flowing state by a predetermined amount of heat during its passage through the resin squeezing zone 15A to remove the surplus resin by the squeezing action, and, at the same time, the fibers are subjected to parallel arrangement, after which the prepreg is forwarded to the subsequent resin gelling zone 15B.

The squeezing angle of the resin squeezing zone 15A is rendered fairly small for preventing the carbon fibers from breakage by bending, the angular values of which should preferably be in a range of from 4 to 6 degrees. This range of the squeezing angle has been empirically established from the result of various studies. When the angle is over 6 degrees, the strength sustaining factor (ROM %) decreases; on the contrary, when it is below 4 degrees, the back tension to the prepreg tape considerably increases due to lowering of the squeezing effect. The resin squeezing zone 15A is adjusted to a relatively low temperature (e.g., 90° C.±10° C. which is preferably in the case of the thermosetting resin being of a heat-resistant grade) so that the impregnated thermosetting resin may not bring about gellation to a substantial degree, and yet its viscosity may be kept minimum. In contrast to this, the subsequent resin gelling zone 15B is adjusted to a high temperature level (e.g., 140° C.±10° C. which is preferable in the case of the thermosetting resin of the above-mentioned grade) so that the resin may complete its gellation in a short moving distance at the former half part of the zone. In addition, the connecting part of both these zones 15A and 15B are in close contact each other without clearance whatsoever between them so as to prevent the carbon fibers from breakage. As the consequence of this, a temperature difference at this connecting part amounts to 50° C. or higher, the difference of which cannot be set off sufficiently by only the temperature adjustment of these two zones 15A and 15B. With a view to solving this problem, therefore, a temperature adjusting mechanism 19 such as, for example, a circulation path for heating or cooling medium is incorporated in a flat portion 15D of the resin squeezing zone 15A (an arrow mark B in this circulation path indicates the flowing direction of the heating and cooling media). Owing to such structural arrangement, the thermosetting resin within the resin squeezing zone 15A becomes hardly gelled. Should it happen that such gellation takes place, the location of such gellation to occur is limited to this flat portion 15D alone, and it in no way leads to increase in the back tension.

The thermosetting resin in the carbon fiber prepreg tape 11 which has been wound on and around the mandrel 8 sent forwarded to the resin gelling zone 15B from the resin squeezing zone 15A promptly brings about gellation on account of the resin gelling zone 15B having been heated to a high temperature as mentioned in the foregoing, whereby a definite gelled state is attained in a short period of time, that is, during its movement in a relatively short distance at the former half part of the zone with the consequence that disturbance in the orientation of the carbon fibers after this process hardly takes place. Accordingly, once the thermosetting resin is gelled in the resin gelling zone 15B to such a degree that the shape of the product 18 may not be deformed, the process thereafter can only be to complete its curing. Thereafter, the diameter of the resin curing zone 15C can be made somewhat larger than that of the shaped product 18, i.e., the diameter of the resin gelling zone 15B with the result that the back tension to the shaped product can be kept as low as possible. By the way, the temperature of the resin curing zone 15C, in this case, may be 160° C. or higher, for example.

In this way, by setting the squeezing angle of the resin squeezing zone as small as 4 to 6 degrees, and by connecting the resin squeezing zone and the resin gelling zone without providing a clearance between them, it becomes possible to suppress breakage of the carbon fibers to the minimum, and also, by gelling the thermosetting resin in the resin gelling zone in its short moving distance at the former half part of the zone, it is possible to eliminate disturbance in the orientation of the fibers. Such remarkable effect is attained by the unique structural arrangement such that, besides the overall temperature adjusting mechanism for the entire zones, the adiabatic temperature adjusting mechanism is interposed between the resin squeezing zone and the resin gelling zone to thereby make it possible to control the temperature of each zone perfectly independently. On account of this, there is no increase in the back tension to be accompanied by the gellation within the resin squeezing zone, which makes it possible to continuously obtain the carbon-fiber-reinforced plastic tubes of thin wall thickness and being less liable to decrease its strength sustaining factor (ROM %) to derive from breakage and disturbance in the orientation of the fibers. Furthermore, the shaping of the carbon-fiber-reinforced plastic tubes according to the present invention is done by the pull-out drive force exerted by the two units of the grasping mechanism 17A and 17B, the operations of which will be explained in the following.

Figure 4:
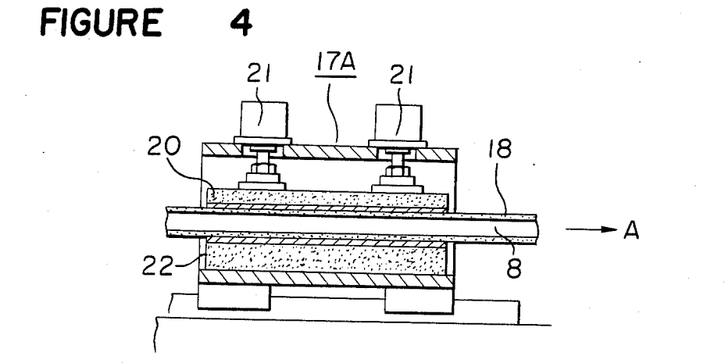
FIG. 4 is an enlarged, longitudinal cross-sectional view of the grasping mechanism shown in FIG. 1.
Figure 5:
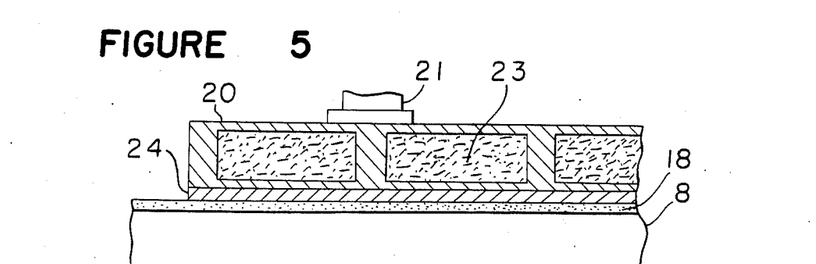
FIG. 5 is an enlarged, longitudinal cross-sectional view showing in more detail a part of the grasping mechanism shown in FIG. 4.

Referring to FIGS. 4 and 5, and upper gripping member 20 is pressed down by cylinders 21, 21 to clamp-hold, under pressure, the shaped product 18 together with the mandrel 8 between the upper gripping member 20 and a lower gripping member 22, in which state both shaped article and mandrel move rightward, thereby effecting the pull-out drive. By the way, it should be noted that the upper gripping member 20 and the lower gripping member 22 have a semi-circular cross-section. In this case, in an attempt to improve the pulling force and to prevent the shaped product from quenching, the upper gripping member 20 and the lower gripping member 22 should preferably be of such a construction that, as shown in FIG. 5, a heat insulating material 23 such as glass wool, etc. is filled in a space defined in and by a frame structure of the upper gripping member 20 with a layer of a urethane type elastomer being attached to the gripping surface thereof.

Figure 6:
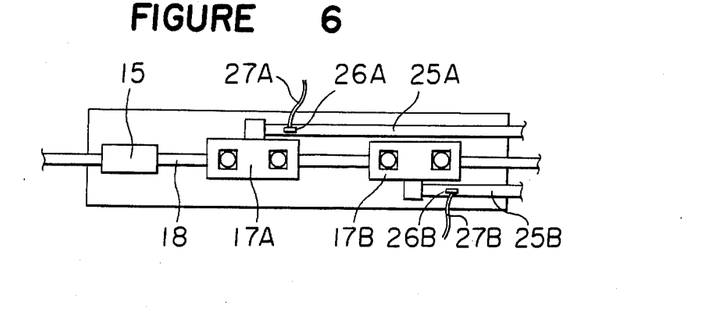
FIG. 6 is a plan view showing the part of the grasping mechanism in the apparatus of FIG. 1.
Figure 7:
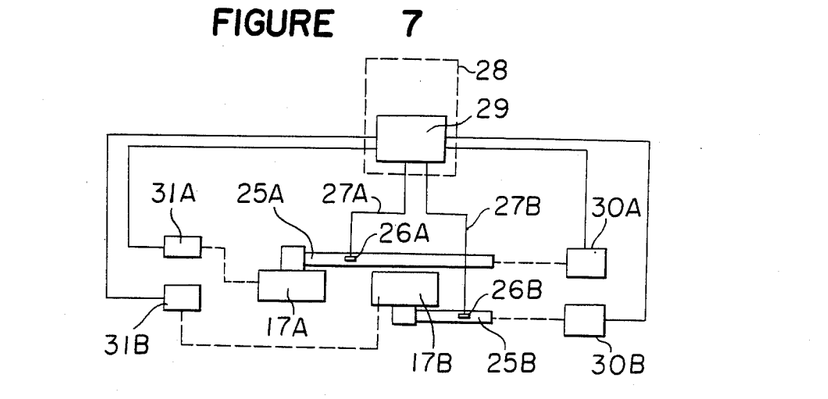
FIG. 7 is a schematic block diagram showing a system for controlling the operations of the grasping mechanism.

In FIGS. 6 and 7, the movement of the grasping mechanism 17A and 17B is done by an expedient which transmits motion of a drive actuator such as motor, hydraulic cylinder, etc. to operating rods 25A and 25B of the respective grasping mechanisms 17A and 17B by way of speed reduction gears, joints, and so on, all of which are in ordinary use. First of all, the first grasping mechanism 17A moves for a predetermined distance and then releases the shaped product 18 at the end of its movement. As soon as the first grasping mechanism 17A turns its moving direction to the leftward and starts to return to its original position, the second grasping mechanism 17B grips the shaped product 18 and starts to move rightward. In this way, the pull-out driving operations of the shaped product is continued. The second grasping mechanism 17B also moves for a predetermined distance, releases the shaped product 18 at the end of its movement. As soon as it beings to go back to its initial position, the first grasping mechanism 17A which has already returned to its initial position grips the shaped product 18 and moves rightward to thereby commence the pulling operation. By repetition of such movements of both grasping mechanisms 17A and 17B, the shaped product 18 is continuously pulled out and the shaping operation is continued. Incidentally, detection of the predetermined positions of both grasping mechanisms 17A and 17B is done by an ordinary control method using detection signals from a microswitch, etc. During the continuous pulling operation, the ring winder 12 is rotated at a speed synchronized with the rightward moving speed of the grasping mechanism by feedback operation, to thereby wind the carbon fiber prepreg tape 11 on and around the mandrel 8.

The change of gripping between the first and the second grasping mechanisms 17A and 17B is done by detection of the pulling force of each grasping mechanism with a view to avoiding any abrupt change in the pulling force. The manner of controlling this change in the gripping operation will now be explained in reference to the control circuit diagram of FIG. 7.

When the first and the second grasping mechanisms 17A and 17B are to be moved rightward through the operating rods 25A and 25B, their moving force is equal to the pulling force. Consequently, the pulling force can be detected by a detector set on each of the operating rods 25A and 25B, i.e., strain gauges 26A and 26B. The strain gauges 26A and 26B are connected with a controller 29 in a control panel 28 through respective lead wires 27A and 27B, and signals from these strain gauses are converted into the pulling force. The first and the second grasping mechanisms 17A and 17B are driven by drive actuators 30A and 30B. Electromagnetic valves 31A and 31B of the cylinders in the grasping mechanisms are equally connected with the controller 29. Assuming now that the shaped product 18 is being pulled by the first grasping mechanism 17A, the pulling force is applied to the operating rod 25A, a distortion is generated in the strain gauge 26A, and the controller 29 detects generation of a predetermined pulling force. At this instant, since no pulling force acts on the operating rod 25B, no pulling force is detected in the strain gauge 26B. When the first grasping mechanism 17A moves for a predetermined distance, the drive actuator 30B of the second grasping mechanism 17B is started, and the moving speed of the second grasping mechanism 17B is made equal to that of the first grasping mechanism. Following this, the electromagnetic valve 31B is operated to grip the shaped product 18, after which the moving speed of the second grasping mechanism 17B is made slightly faster than that of the first grasping mechanism 17A, whereupon the force to be applied to the second grasping mechanism 17B gradually increases. This force is detected by the strain gauge 26B, and, when this force comes closer to the above-mentioned predetermined pulling force, or when it becomes equal to, or higher than, the predetermined pulling force, the first grasping mechanism 17A releases its gripping action and stops its movement, at which the impact force to be applied to the second grasping mechanism 17B becomes very small. The same control is done, even when the gripping is to be changed from the second grasping mechanism 17B to the first grasping mechanism 17A. By repetition of these operations, the pulling of the shaped product 18 can be continued smoothly.

In this way, the detection of the pulling force to change the gripping from one to the other, there takes place no abrupt change in the pulling force at the time of change of the gripping, on account of which the buckling and disturbance in orientation of the carbon fibers due to the pulsing motion of the grasping mechanism can be prevented, and damage or breakage of the shaped product can be prevented. Also, since a urethane type elastomer is attached onto the gripping surface so as to give it the adiabatic effect, the frictional coefficient of the gripping surface is improved to be able to obtain thereby a higher pulling force with a lower gripping force than the conventional apparatus, which not only enables the apparatus to improve its performance, but also enables the shaped product of thin thickness to be gripped and pulled out without destroying the same. Furthermore, owing to the adiabatic effect, the shaped product is free from heat shock due to quenching, which makes it possible to prevent the shaped product from deformation due to destruction and heat distortion.

Incidentally, since the mandrel to be used has a length of 2 meters per piece, a plurality of such mandrels are connected with screws and nuts at their adjacent ends to be formed into a continuous length. The carbon-fiber-reinforced plastic tube as shaped, covering the mandrel, is cut in conformity to the unit length (2 meters) of the mandrel, after which the mandrel of the unit length is separated from the adjacent mandrels by unscrewing, thereafter the shaped carbon-fiber-reinforced plastic tube covering the mandrel is removed therefrom.

In the above-described embodiment of the present invention, the lamination of the prepreg tape on and around the mandrel has been explained in the case where it is wound in the peripheral direction by the ring winder unit. It is however possible that the shaped article with increased length in the axial direction is obtained by incorporation of a parallel arranging unit for the purpose of increasing the strength in the axial direction. Furthermore, by varying the arrangement of each unit, there can be obtained the shaped product having an arbitrary laminar structure.

Moreover, explanations have been given as to a case where the adiabatic temperature adjusting mechanism is provided in the resin squeezing zone. It should, however, be noted that such temperature adjusting mechanism may also be provided in the resin gelling zone. Depending on the kind of the resin to be used, the same effect can be obtained without the adiabatic temperature adjusting mechanism.

In addition, by keeping increase in the back tension to the minimum extent immediately before the hot die squeezing zone after preheating of the prepreg, by setting the inner diameter of the die at a slightly larger size so as not to cause damage to the carbon fibers, and by providing a pre-squeezing ring adjusted to a predetermined temperature level, it becomes possible to eliminate inter-layer voids which were present at the time of winding the prepreg tape, and to remove the shaped product from the mandrel with much higher precision.

Detection of the pulling force when the shaped product is to be pulled out together with the mandrel can also be done by other substitute means such as the detection of the pulling force by the increase in the motor current.

As has been explained in the foregoing, the present invention is so constructed that the carbon fiber prepreg tape impregnated with the thermosetting resin is laminated on and around the mandrel, then the laminated body on the above-mentioned mandrel is preheated, thereafter the preheated laminate is pulled in and through the hot die along with the above-mentioned mandrel, during which the thermosetting resin is gelled, cured, and shaped into the carbon-fiber-reinforced plastic tube, the pulling operation at this time being effected continuously by alternate operations of the first and second grasping mechanism, in which the pulling force of the second grasping mechanism is generated, while the pulling force of the first grasping mechanism still remains, and the above-mentioned laminate is perfectly gelled at the former half part of the hot die. With such construction according to the present invention, breakage of the carbon fibers during the steps of the material supply and of laminating the prepreg tape on and around the mandrel can be prevented, the fiber content $V_f$ and the resin property can be made readily controllable; and further disturbance in the orientation and uneven distribution of the fibers can be prevented by gellation of the resin at the former half part of the hot die, and further, by use of two units of the grasping mechanism in a manner to generate the pulling force of one of the grasping mechanism, while the pulling force of the other grasping mechanism still remains, the fibers are prevented from buckling.

Further, when the prepreg is preheated indirectly by the induction heating of the mandrel made of a magnetic material, there is no heat discharging phenomenon to the mandrel having a large heat capacity as in the conventional apparatus, hence the temperature control at the time of the curing and shaping can be done with good precision. As the result of this, lowering in the strength sustaining factor (ROM %) to take place in inter-relationship with the temperature control from melting to curing of the resin, the uneven distribution of the carbon fiber, to be derived from breakage and disturbance in the orientation of the carbon fibers can be kept minimum, thereby being able to facilitate shaping of the carbon-fiber-reinforced plastic tubes of a thin wall thickness, e.g., 1.0 mm or less.

In the foregoing, the present invention has been described with particular reference to a preferred embodiment thereof as illustrated in the accompanying drawing. It should however be noted that the embodiment is illustrative only and not so restrictive, and that changes and modifications may be made by those persons skilled in the art without departing from the sprit and scope of the invention as recited in the appended claims.

We claim:

1. A method for continuous shaping of carbon-fiber-reinforced plastic tubes having a wall thickness of 0.5 mm or less, which comprises steps of:
    (a) supporting a rod-like mandrel for forming a tube so as to be movable in its longitudinal direction;
    (b) laminating carbon fiber prepreg in tape form impregnated with a thermosetting resin on and around said mandrel;
    (c) preheating said laminate provided on said mandrel;
    (d) providing a hot die having an insertion part through which said mandrel having said preheated laminate is passed; and
    (e) pulling said preheated laminate in and through said hot die together with said mandrel, during which it is gelled, cured, and shaped into the carbon-fiber-reinforced plastic tubes, said pulling operation being done continuously by alternate operations of a first grasping means and a second grasping means, wherein said first and second grasping means, which respectively have gripping members for gripping or releasing said mandrel with said laminate of the prepreg of tape form and are disposed so as to be movable in the axial direction of said mandrel, carry out said pulling step by the movement in the axial direction while said mandrel is gripped by said gripping member, and wherein the pulling force of the second grasping means is generated, while the pulling force of the first grasping means still remains, and completing gellation of said laminate at the former half part of said hot die.

2. A method for continuous shaping of carbon-fiber-reinforced plastic tubes according to claim 1, wherein said mandrel is subjected to induction heating to indirectly preheat said laminate through the steps of laminating said carbon fiber prepreg in tape form impregnated with the thermosetting resin on and around said mandrel formed of a magnetic material, and causing said laminate provided on said mandrel to pass through a high frequency preheater.

3. A method for continuous shaping of carbon-fiber-reinforced plastic tubes according to claim 1, wherein said carbon fiber prepreg is continuously wound on and around said mandrel at a speed synchronous with the pulling speed of said mandrel.

4. A method for continuous shaping of carbon-fiber-reinforced plastic tubes according to claim 1, wherein said carbon fiber prepreg is laminated continuously on and around said mandrel at a speed synchronous with the pulling speed of said mandrel, while it is being arranged in the axial direction of said mandrel.

5. A method for continuous shaping of carbon-fiber-reinforced plastic tubes according to claim 1, wherein said hot die is constructed with a resin squeezing zone, a resin gelling zone, and a resin curing zone.

6. A method for continuous shaping of carbon-fiber-reinforced plastic tubes according to claim 5, wherein a squeezing angle of said resin squeezing zone is in a range of from 4 to 6 degrees.

7. A method for continuous shaping of carbon-fiber-reinforced plastic tubes according to claim 5, wherein said resin squeezing zone, said resin gelling zone, and said resin curing zone are temperature-adjusted individually and separately, and wherein an adiabatic temperature adjusting means is provided between said resin squeezing zone and said resin gelling zone to render said both zones to be heat-insulating.

8. A method for continuous shaping of carbon-fiber-reinforced plastic tubes according to claim 1, wherein the gripping by said first grasping means is released when the pulling force of said second grasping means becomes equal to, or greater than, the pulling force of said first grasping means.

9. A method for continuous shaping of carbon-fiber-reinforced plastic tubes according to claim 8, wherein the gripping surface of said grasping means is formed of a urethane type elastomer.

10. An apparatus for continuous shaping of carbon-fiber-reinforced plastic tubes having a wall thickness of 0.5 mm or less, which comprises in combination:
 (a) a rod-like mandrel for forming tube, which is supported being movable in its axial direction;
 (b) means for laminating carbon fiber prepreg in tape form impregnated with a thermosetting resin in synchronism with a moving speed of said mandrel;
 (c) means for preheating said prepreg laminated on and around said mandrel;
 (d) a hot die for gelling and curing said preheated prepreg forwarded thereinto together with said mandrel, and for shaping the same into the carbon-fiber-reinforced plastic tubes, said hot die being constructed with a resin squeezing zone, a resin gelling zone, and a resin curing zone, each of said zones being temperature-controlled individually and separately;
 (e) first and second grasping means for gripping and pulling said shaped product from said hot die together with said mandrel;
 (f) first and second detectors for detecting the pulling force of each of said grasping means; and
 (g) pull-out drive means having a controller for generating the pulling force of said second grasping means, while said first grasping means still retains its pulling force, on the basis of the pulling force as detected by said first and second detectors.

11. An apparatus for continuous shaping of carbon-fiber-reinforced plastic tubes according to claim 10, wherein said carbon fiber prepreg in the tape form impregnated with a thermosetting resin is laminated on a mandrel formed of a magnetic material, then said mandrel is subjected to induction heating with a high frequency in a frequency band of from 10 to 50 KHz, and said carbon fiber prepreg is indirectly heated by said mandrel.

12. An apparatus for continuous shaping of carbon-fiber-reinforced plastic tubes according to claim 10, wherein a squeezing angle of said resin squeezing zone is in a range of from 4 to 6 degrees.

13. An apparatus for continuous shaping of carbon-fiber-reinforced plastic tubes according to claim 10, wherein said means for laminating the carbon fiber prepreg in tape form on and around said mandrel is constructed with a unit for winding said prepreg in the peripheral direction of said mandrel, and a unit for laminating said prepreg on and around said mandrel in the axial direction thereof, while arranging the fibers in parallel.

* * * * *